Dec. 2, 1947.  R. NEUSCHOTZ  2,431,884
METHOD OF EXPANDING PEARLITE
Original Filed Aug. 31, 1943
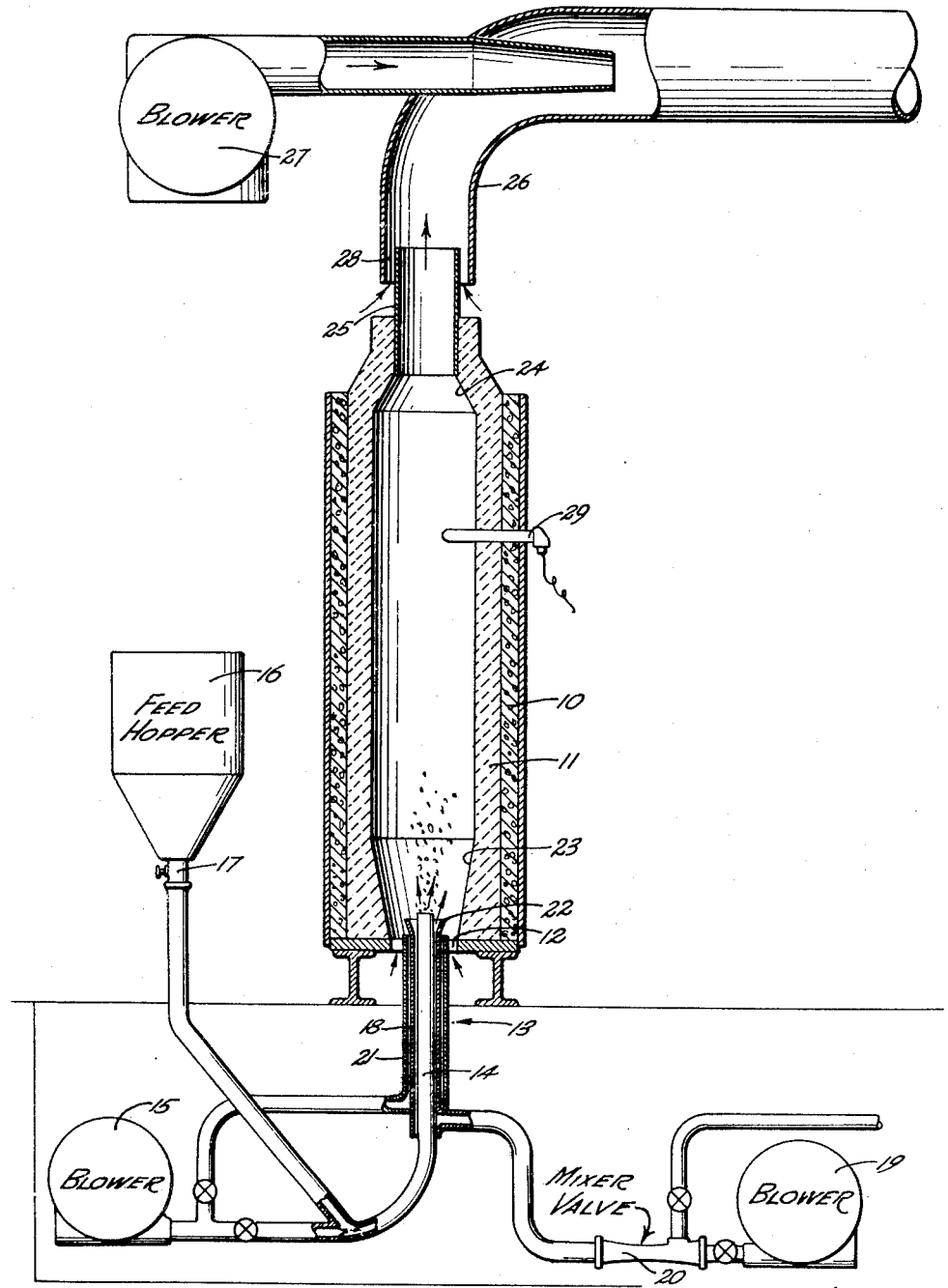
Inventor
ROBERT NEUSCHOTZ
By Hazard and Miller
Attorneys Patented Dec. 2, 1947

2,431,884

UNITED STATES PATENT OFFICE 2,431,884

METHOD OF EXPANDING PEARLITE

Robert Neuschotz, Los Angeles, Calif.

Original application August 31, 1943, Serial No. 500,657. Divided and this application April 11, 1944, Serial No. 530,475

5 Claims. (Cl. 252—378)

This invention relates to a method of expanding pearlite (sometimes spelled perlite) mica and like expandible or exfoliating materials.

Pearlite is a brittle, friable mineral, black to pearl gray in color, the name being applied to it to distinguish it from obsidian, another form of volcanic glass. Pearlite is basically aluminum silicate containing appreciable amounts of other substances such as soda, potash, lime and magnesium. It contains usually in excess of 2% water of crystallization. When this mineral is subjected to a high temperature, in the neighborhood of 2000° F. it begins to melt or become plastic. The water of crystallization is quickly converted into steam and expands the softened mineral, puffing or popping it to a volume ten times or more than its original volume. The resulting product has a wide variety of advantageous uses. Being in the nature of a glass it is inert to water and many acids and being highly porous and cellular it possesses excellent heat insulating properties. As its density is quite low large volumes of it may be employed where weight is an important factor to be taken into consideration.

Heretofore pearlite has been popped or puffed by subjecting pearlite granules to a high heat. However, difficulties have been experienced as follows: A short time element is involved in raising the temperature of the granules to that required to render them plastic. If the granules are fed into a zone of high temperature, usually from three to five seconds time is required to bring the granules to the temperature wherein they are plastic and the steam generated by the water of crystallization can be effective to puff or expand them. When the granules have been rendered plastic and have been puffed or expanded, if they are allowed to remain in the zone of high temperature they will deposit on surrounding surfaces, form clinkers which melt or coalesce into a glass somewhat in the nature of obsidian. It is therefore important and a primary feature of the present invention to provide a method of expanding pearlite granules wherein the granules are fed into a zone of high temperature, allowed to remain there the necessary time to bring the granules to a plastic condition and cause the water of crystallization to expand them and then immediately remove the expanded granules from the zone of high temperature and cool them so that they will not deposit or coalesce on surrounding surfaces but instead will be removed as a puffed highly cellular product.

The present application is a divisional application of the subject matter disclosed in my copending application Serial No. 500,657, filed August 31, 1943, now Patent No. 2,421,902.

While the invention has been primarily designed for expanding pearlite, it is equally applicable to other like materials such as mica which can be expanded or exfoliated. Many of the problems involved in expanding pearlite are also present in exfoliating vermiculites, although they may be present to a somewhat smaller degree.

The present invention contemplates a method of expanding pearlite granules and like substances wherein the granules are fed into a furnace within which there is a zone of high temperature created by an upwardly directed burner. While the granules may be dropped in the furnace toward the zone of high temperature they are preferably discharged upwardly within the burner into the furnace and then allowed to fall downwardly therein. The time required for the particles to ascend within the furnace and then to descend toward the flame provides an adequate time period within which the particles may be brought up to the required temperature to cause them to be expanded or exfoliated.

As soon as the particles are expanded, due to their volume becoming greatly increased, the blast becomes effective to remove the expanded particles immediately from the vicinity of the flame or zone of high temperature. Thus once the particles have expanded they are conveniently and automatically removed so that they have no adequate opportunity to settle or deposit themselves on surrounding surfaces.

Frequently the mineral contains certain impurities such as obsidian that will not be expanded by the heat. If the water of crystallization present is very low, such as for example only one half of one percent, the particles will not be expanded to any noticeable or material extent. These particles which refuse to expand under the influence of heat, while they may be temporarily supported by the upwardly flowing blast, eventually settle therethrough and in this respect the method is highly advantageous in that it not only satisfactorily puffs or expands the pearlite particles, but also effects a continuous and automatic separation of any impurities or particles that refuse to be expanded under the influence of heat.

Another object of the invention is to provide a method of expanding pearlite and like materials wherein the particles of pearlite subject to heating in a furnace wherein there is an upwardly directed burner that is disposed within a downwardly tapered throat through which outside and relatively cool air may be drawn. This tapering throat is so designed as to cause the incoming air and the products of combustion of the burner to ascend in the furnace at gradually decreasing velocity. In this manner as the pearlite particles are allowed to fall toward the zone of highest temperature, their downward movement is constantly decelerated whereby those particles which expand most readily will expand somewhat above the zone of highest temperature and will be immediately removed from the high temperature zone. Those particles which are most difficult to expand will fall farther toward the zone of highest temperature and during their continued downward movement they will be decelerated. These particles are consequently subjected to a longer heating period and are consequently given adequate opportunity to expand.

With the foregoing and other objects in view which will be made manifest in the following detailed description and specifically pointed out in the appended claims, reference is had to the accompanying drawings for an illustrative embodiment of the invention wherein the figure is a sectional view through a furnace that may be utilized in carrying out the present method.

Referring to the accompanying drawing, wherein similar reference characters designate similar parts throughout, the furnace in its preferred form comprises an outer wall structure indicated at 10, preferably in the form of an upright cylinder. The outer wall structure is preferably encased in a steel cylinder or shell as shown. Within this outer furnace wall structure there is a lining 11 of a suitable refractory material. The bottom of the furnace has an entrance adjacent the center thereof indicated at 12 and an upwardly directed burner generally indicated at 13 extends therein. This burner is of small unique construction and is primarily designed for accomplishing the purposes above set forth. It consists of a central tube 14 supplied with air from a blower 15. The pearlite that is to be expanded is supplied or fed from a hopper 16. Preferably a vibrator type of feed valve 17 is arranged at the bottom of the hopper to insure constant and easy flow of the pearlite granules therefrom. The pearlite placed in the feed hopper is crushed and preferably screened so that the granules are in the neighborhood of 10 or 12 mesh in size and smaller. A small jet or nozzle may be located in the pipe leading from blower 15 to pick up the fed pearlite granules and carry them upwardly through pipe 14. The air and pearlite granules are thus discharged upwardly in the furnace centrally of the burner. A second tube 18 is arranged concentrically around the inner tube 14. This tube is supplied with a mixture of air and gas or other fuel. The air is supplied from a suitable blower such as that indicated at 19 and fuel from any suitable source of supply is mixed therewith in a mixer valve indicated at 20. The air and fuel mixture are discharged upwardly in the space between the inner tube 14 and the outer tube 18.

Surrounding the outer tube there is still a further tube 21 which may be supplied with air from a blower 15. This tube is arranged concentrically with relation to the tube 18 and centrally of the entrance 12. It will be noted that the tube 18 is flared outwardly as indicated at 22. This outward flaring is conducive to a creation of a short flame and also tends to direct the air blast issuing from the space between the tubes 18 and 21 outwardly against the downwardly converging lower walls 23 of the furnace. In this manner the air blast issuing from tube 21 is spread against the converging bottom of the furnace and a draft is created to draw in additional air through entrance 12 against these walls so as to adequately cool them.

At the top of the furnace the lining is constructed as at 24 and is equipped with an outlet conduit 25 which extends into a suitable conduit 26 in spaced relation to the walls thereof. Conduit 26 serves to conduct off the puffed or expanded pearlite. Preferably it discharges into a cyclone dust collector. A blower 27 may discharge into this conduit so as to induce a high velocity therein and to induce the admission of additional air through the space 28 which tends to cool the walls of the conduit and the expanded pearlite particles moving therethrough. The blower 27 may be arranged as illustrated or may be arranged adjacent the end of the conduit 26 immediately ahead of the dust collector. There are advantages and disadvantages to both positions. If the outlet from the blower 27 is arranged as indicated the pearlite particles may be more readily cooled thereby, however, the discharge from the blower is apt to form an impediment against the regular flow of the pearlite particles. Also the speed at which the pearlite particles are discharged into the dust collector may be somewhat dissipated if the blower 27 is located too remote from the dust collector. If the blower is located in conduit 26, immediately ahead of the dust collector, there is danger of the blades of the blower impinging the particles of expanded pearlite and thus unnecessarily reducing their size. Either position of the blower will normally produce satisfactory results. 29 indicates a thermo coupling connected to a pyrometer of the indicating type or of an automatic temperature control.

In carrying out the method of the present invention the pearlite granules together with air from blower 15 are discharged upwardly in the bottom of the furnace. As they rise therein they have an opportunity to become heated by the surrounding flame. These particles after having been projected upwardly tend to fall downwardly toward the flame and during this falling a further opportunity is afforded to heat them. The rising and falling of the granules adjacent the flame will automatically allow for the necessary time factor to elapse to bring the particles up to their puffing or expanding temperature. When the particles are puffed or expanded their volume increases enormously with the result that their specific gravity is greatly decreased. The air blast which is directed upwardly through the furnace and which is composed of the air issuing from the inner tube 14, the products of combustion of the flame and air issuing from the outer tube 21 and such additional air that is drawn into the bottom of the furnace through entrance 12, become immediately effective to sweep the popped or expanded pearlite up through the furnace and into the conduit 26. After these particles pass into the conduit 26, cool air is drawn into the conduit through space 28. This cool air is effective to quickly cool the particles and to maintain the walls of the conduit 26 adequately cooled. Some particles may delay in being popped or expanded and these particles may float temporarily on or around the flame and adjacent air blast until they are ultimately popped or expanded and then swept out of the furnace. Frequently pearlite contains some impurities such as obsidian, or certain particles have their water of crystallization present in a quantity which is too low to effectively expand them. These particles which refuse to expand after being temporarily supported or suspended around and over the flame, ultimately drop through entrance 12. In this manner there is a constant and automatic operation of unexpandable particles from the expanded pearlite.

A difficulty encountered in expanding pearlite is the danger of the particles settling or collecting on the furnace walls. By the present construction it will be noted that a relatively large quantity of comparatively cool air is drawn inwardly and swept upwardly adjacent the furnace walls. This cool air serves to maintain the lining surfaces adequately cool and tends to keep the pearlite particles moving at adequate velocity so that they will not stick or collect on the furnace walls. The introduction of air at space 28 tends to cool the particles after expansion and also to keep them from sticking to the walls of the conduit 26. It will be noted that the bottom of the lining provides a downwardly tapered or constricted throat about the top of the burner, consequently air drawn therein is at a maximum upwardly velocity at the bottom of the throat. This velocity gradually decreases upwardly. Those particles or granules which are discharged into the furnace, on falling, will consequently encounter an upwardly directed blast of high velocity but not of maximum velocity. As they continue to fall toward the burner or toward the zone of highest temperature they gradually encounter the upward flow of air and products of combustion of continually increasing velocity. Consequently those particles which are readily expandible may be expanded some distance above the burner and on being expanded will immediately be swept out of the furnace. Particles that are somewhat more difficult to expand will descend toward the burner but will have their downward movement arrested or retarded by their encountering a continuing higher velocity. Those particles which are most difficult to expand will continue to settle towards the burner but as they approach the burner their downward movement is retarded to the maximum extent. In this way the particles that are fed into the furnace will tend to automatically stratify and arrange themselves at the level that will have the required temperature to effect their expansion. The improved furnace is therefore highly advantageous in that it effectively protects the walls of the furnace against particles coming in contact therewith and coalescing thereon. The walls are effectively kept cool and adequate time periods are permitted for the heating of the granules to the required temperature to effect their expansion. Furthermore, the construction is such as to cause the particles to automatically arrange themselves or stratify themselves in accordance with the temperatures required of them to effect their expansion and those particles which refuse to be expanded entirely under the influence of heat are continuously and automatically separated by reason of the fact that they ultimately drop down between the burner and the walls of the bottom of the furnace.

From the above described method and apparatus it will be appreciated that a novel, simple, and advantageous method of expanding pearlite has been developed which can be continuously performed and which will serve to satisfactorily expand the pearlite granules. Adequate precaution is taken against the depositing of granules on the furnace walls and the conduit 26 leading therefrom. Provision is also made for adequately allowing sufficient time to elapse after the particles are brought into the vicinity of the flame to enable popping to take place. If among the particles or granules fed to the furnace there are expandible impurities, an automatic and continuous separation of these particles from the remainder is caused to take place. Larger particles will tend to remain in the burner flame area longer than smaller particles and thus may be expanded fully. Smaller particles which do not require as much time for the heat to penetrate them will be automatically segregated in the higher portion of the furnace where they are subjected to a lower upward velocity.

It will be noted that the pearlite granules are fed into the zone of high temperature centrally of the furnace, thus reducing any tendency to contact with the walls. As the walls are maintained relatively cool it is possible to dispense with the refractory lining and the furnaces in some instances may be formed merely of a stainless steel shell or a shell formed of other known readily corrodible material to which the pearlite will not readily stick.

Various changes may be made in the details of construction without departing from the spirit and scope of the invention as defined by the appended claims.

I claim:

1. The method of expanding pearlite granules which consists of feeding the particles to be expanded into the center of a vertically directed upward flame disposed between furnace walls, and discharging air under pressure in an upward direction between the flame and the walls so that the zone of high temperature in which the granules are heated and expanded will be effectively surrounded by an ascending annulus of cooler air and to cool the walls and cooperate with the flame in carrying the expanded particles upwardly, collecting the expanded particles above the flame and introducing air adjacent the walls of the collecting means to cool the walls and avoid contact of the expanded particles therewith.

2. The method of expanding pearlite granules which consists of feeding the granules to be expanded into the center of an upwardly directed flame, disposed between furnace walls and discharging air under pressure upwardly about the flame so that the zone of high temperature in which the granules are heated and expanded will be effectively surrounded by an ascending annulus of cooler air and contact of the expanded particles with the furnace walls is avoided.

3. The method of expanding pearlite granules which consists of feeding the granules to be expanded into the center of an upwardly directed flame, disposed between furnace walls and discharging air under pressure upwardly and outwardly of the flame so that the zone of high temperature in which the granules are heated and expanded will be effectively surrounded by an ascending annulus of cooler air and contact of the expanded particles with the furnace walls is avoided.

4. The method of expanding pearlite granules which consists of feeding the granules to be expanded into the center of an upwardly directed flame in a vertically disposed furnace, discharging air under pressure in an upward direction about the flame so that the zone of high temperature in which the granules are heated and expanded will be effectively surrounded by an ascending annulus of cooler air and allowing additional air to be drawn into the furnace by the ascending flame and discharged air and carried thereby adjacent the walls of the furnace to assist the discharged air in cooling them and contact of the expanded particles with the furnace walls is avoided.

5. The method of expanding pearlite granules which consists of feeding the granules to be expanded into the center of an upwardly directed flame in a vertically disposed furnace, discharging air under pressure in an upward direction about the flame so that the zone of high temperature in which the granules are heated and expanded will be effectively surrounded by an ascending annulus of cooler air and allowing additional air to be drawn into the furnace by the ascending flame and discharged air and carried thereby adjacent the walls of the furnace to assist the discharged air in cooling them and contact of the expanded particles with the furnace walls is avoided, the furnace having upwardly divergent walls so that the speed of the ascending air and flame progressively decreases upwardly.

ROBERT NEUSCHOTZ.

REFERENCES CITED

The following references are of record in the file of this patent:

UNITED STATES PATENTS

| Number | Name | Date |
| --- | --- | --- |
| 920,336 | Hughes | May 4, 1909 |
| 1,963,276 | Miner et al. | June 19, 1934 |
| 2,129,523 | Butler | Sept. 6, 1938 |
| 2,300,042 | Caldwell | Oct. 27, 1942 |

OTHER REFERENCES

Kozu, in Science Reports, Tohoku Imperial University, series 3, vol. 3, pages 225–238 (1929).